(12) United States Patent
Cash, Jr.

(10) Patent No.: US 6,514,652 B2
(45) Date of Patent: Feb. 4, 2003

(54) SMART MODULAR RECEPTACLE AND SYSTEM

(76) Inventor: Ronald G. Cash, Jr., 12177 W. Cooper Dr., Littleton, CO (US) 80127

( * ) Notice: Subject to any disclaimer, the term of this patent is extended or adjusted under 35 U.S.C. 154(b) by 0 days.

(21) Appl. No.: 10/068,747

(22) Filed: Feb. 5, 2002

(65) Prior Publication Data

US 2002/0086567 A1 Jul. 4, 2002

Related U.S. Application Data

(63) Continuation-in-part of application No. 09/643,013, filed on Aug. 21, 2000, which is a continuation-in-part of application No. 09/566,858, filed on May 8, 2000.

(51) Int. Cl.[7] .......................... H01R 4/66; H01R 13/648
(52) U.S. Cl. ........................................ 430/106; 439/650
(58) Field of Search ............................... 439/106, 107, 439/650, 658, 216, 76.2; 315/292; 340/310.01

(56) References Cited

U.S. PATENT DOCUMENTS

| | | | |
|---|---|---|---|
| 1,481,286 A | 1/1924 | Wood | 137/607 |
| 2,700,752 A | 1/1955 | Cataldo | 439/650 |
| 2,771,501 A * | 11/1956 | Despard | 174/53 |
| 3,022,485 A | 2/1962 | Buchanan | 439/658 |
| 3,038,141 A | 6/1962 | Chiuchiolo | 439/650 |
| 3,500,130 A | 3/1970 | Aument et al. | 361/731 |
| 3,510,822 A | 5/1970 | Patterson | 439/107 |
| 3,715,627 A | 2/1973 | D'Ausilio | 317/99 |
| 3,860,319 A | 1/1975 | Slater | 439/400 |
| 4,245,880 A | 1/1981 | Zimmerman et al. | 439/405 |
| 4,418,333 A | 11/1983 | Schwarzbach et al. | 340/310 |
| 4,820,197 A | 4/1989 | Stumpff et al. | 439/535 |
| 4,958,048 A | 9/1990 | Bell | 174/53 |
| 5,095,502 A * | 3/1992 | Finzel | 379/40 |
| 5,207,599 A | 5/1993 | Chung | 439/650 |
| 5,239,129 A | 8/1993 | Ehrenfels | 174/51 |
| 5,357,170 A | 10/1994 | Luchaco et al. | 315/159 |
| 5,406,176 A | 4/1995 | Sugden | 315/292 |
| 5,420,482 A | 5/1995 | Phares | 315/292 |
| 5,450,334 A | 9/1995 | Pulizzi et al. | 364/492 |
| 5,471,012 A | 11/1995 | Opel | 174/53 |
| 5,515,236 A * | 5/1996 | Nolan et al. | 361/652 |
| 5,595,491 A | 1/1997 | May | 439/106 |
| 5,621,282 A | 4/1997 | Haskell | 315/324 |
| 5,663,525 A | 9/1997 | Newman | 174/50 |
| 5,675,194 A | 10/1997 | Domigan | 307/147 |
| 5,735,710 A | 4/1998 | Blaauboer et al. | 439/535 |
| 5,762,525 A | 6/1998 | Candeloro | 439/660 |
| 5,848,915 A | 12/1998 | Canizales | 439/650 |
| 5,853,302 A | 12/1998 | Roman et al. | 439/629 |
| 5,973,414 A | 10/1999 | Båberg | 307/116 |
| 6,112,127 A | 8/2000 | Bennett | 700/86 |
| 6,144,291 A | 11/2000 | Odinak et al. | 340/310.01 |
| 6,175,201 B1 | 1/2001 | Sid | 315/312 |
| 6,201,187 B1 | 3/2001 | Burbine | 174/60 |
| 6,202,017 B1 | 3/2001 | Bleckmann et al. | 701/70 |

* cited by examiner

Primary Examiner—Lynn Field
Assistant Examiner—Hae Moon Hyeon
(74) Attorney, Agent, or Firm—Lee G. Meyer; Meyer & Associates, PC

(57) ABSTRACT

A modular junction box receptacle includes parallel high and low voltage circuitry portions separated by a barrier. A base housing of the receptacle receives a termination block that includes high and low voltage connections to respective high and low voltage portions of the base housing. A housing cover is installed over the base housing and termination block; the cover has an opening for passage thereinto of a face portion of the block. The receptacle accommodates a plug and play unit containing smart circuitry, the unit including high and low voltage circuitry connections for respective high and low voltage portions of the termination block. The unit can act as a variety of interchangeable devices in a smart system that incorporates pluralities of receptacles, including electrical outlets and simple electrical toggle switches, each containing low voltage connections. A plurality of such units may be incorporated in, for example, a household circuitry system.

24 Claims, 10 Drawing Sheets

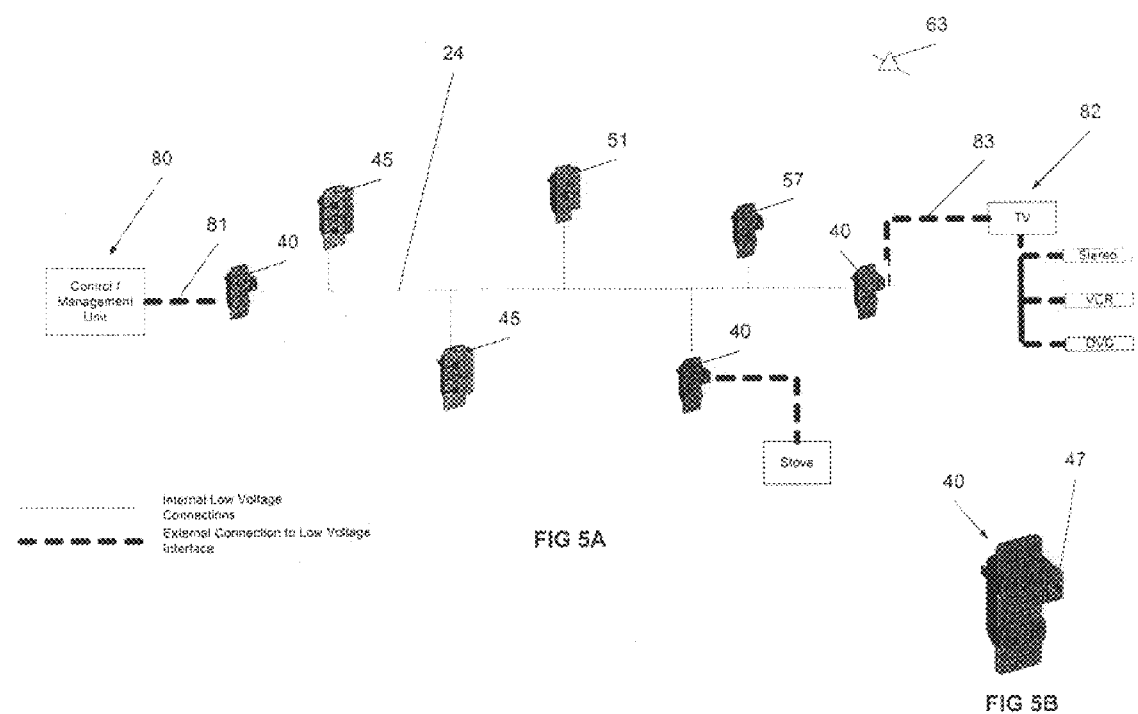

SMART MODULAR RECEPTACLE AND SYSTEM

RELATED APPLICATION

This application is a continuation-in-part of U.S. application having serial number 09/643,013, filed Aug. 21, 2000 for "System and Method for Configuring Electrical Receptacles", which is a continuation-in-part of U.S. application having serial number 09/566,858, filed May 8, 2000 for "Electrical Junction Box Having a Plug-In Receptacle". The complete disclosures of each of the related applications are hereby incorporated by reference herein.

BACKGROUND OF THE INVENTION

1. Field of Invention

The present invention relates to improvements in electrical receptacles for use in residential and commercial electrical wiring systems, and particularly to electrical receptacles formed of modular parts for use in electrical wiring systems. More particularly the invention also relates to improved systems and methods for controlling remotely operated electrical devices through electrical wiring of residential and commercial building structures. Finally the invention relates to modular electrical receptacles having capacity for embodying changeable functionality of electrical devices through external programming.

2. Description of the Prior Art

Those skilled in the art will appreciate that for safety reasons state and federal building codes require that electrical wiring be fully contained between exterior and interior wall structures of buildings, between floors of buildings and the ceilings beneath the floors, and be otherwise fully contained within rigid enclosures of buildings. Normally the electrical wiring is installed after interior wall frames are erected in a building, but before interior walls are actually installed and secured against the sides of the frames. In modem construction, the frames may be made of either wood or steel.

For providing electrical outlets, ceiling fixtures, wall switches, and the like, an electrical junction box is employed. The junction box is often made of plastic, or other nonconductive material, and is physically mounted to a frame structure to later be connected to previously installed wiring. After the wall surfaces, e.g., drywall or plaster, are in place, physical access to the junction boxes is achieved via appropriate openings that are typically formed by cutting into and through the wall surfaces.

Standard residential and commercial electrical systems incorporate a plurality of electrical junction boxes, each of which provides electrical connection for the wires of electrical receptacles, such as electrical outlets, switches, fixtures, and the like, to electrical wiring of the building. Although conventional electrical systems including such junction boxes function at least adequately, they suffer from a variety of limitations. Traditional electrical wiring convention requires a junction box to connect electrical wires of a building to a particular electrical receptacle. Such connectivity is achieved by terminating wires that are stripped at the receptacle in order to complete a proper, flush-mounted wall installation of any given electrical receptacle. However, the associated wires and connectors must first be connected electrically to the receptacle, and the receptacle with the attached wires must then be inserted back into the junction box.

In the event that power is not shut off while the electrical receptacle is connected to the electrical system, the installer is subject to receiving an electrical shock because the junction box contains a plurality of open wires and connections that are exposed. Indeed, novice installers, such as homeowners for example attempting to complete the installation of a simple light fixture or ceiling fan, often make such connections incorrectly. The wires are normally crammed into a junction box relatively tightly, and thus are subject to short-circuiting, with commensurate risks of initiating electrical fires.

Standard electrical practices create additional limitations. For example, current electrical systems permit only switched control of fixtures and/or outlets directly wired to same junction box as the switch. In an effort to circumvent this disadvantage, multiple gang junction boxes have been used for terminating several switches in a single location, thereby permitting convenient control of multiple fixtures or groups of fixtures. Further, since electrical circuits of a building cannot be tested fully until after walls of the building are erected, electrical connectivity errors or problems related to proper switch control of particular outlets and fixtures are frequent, especially in the case of multi-way switches where more than one switch controls a single fixture or group of fixtures. These errors are costly and time-consuming to correct, and require that associated portions of interior walls be removed and reconstructed after such electrical errors have been located and repaired.

In addition, current electrical practices provide no standard system or method to permit monitoring, controlling, reconfiguring, or otherwise changing functionality of a particular receptacle, without either directly modifying the receptacle or otherwise acting upon a control mechanism (i.e., a switch or other control device) dedicated to controlling or monitoring the particular receptacle(s), and that is directly wired to the receptacle(s).

It therefore would be advantageous to have an electrical junction box that facilitates convenient and simple installation and removal of electrical receptacles. It would also be advantageous to have an electrical junction box wherein electrical wires of an electrical system of a building terminate in a secure area of a junction box, rather than directly on an exposed electrical receptacle connected to the junction box. It would further be advantageous to have a junction box that provides a pair of plug-and-play terminals into which electrical receptacles could be readily and conveniently plugged for connection to the electrical system of a building. It would further be advantageous to have a method of communicating between the electrical receptacles within the electrical system, which method would not be affected by the opening or closing of a switch. It would also be advantageous to have an electrical system that provides devices to monitor, control, and/or reconfigure individual electrical receptacles connected to the system without regard to specific location of the receptacles within the system. It would also be advantageous to have a wiring system that would enable changes to the location of a particular receptacle without affecting the receptacle's function or its ability to monitor, be monitored, control, or be controlled. It would also be advantageous to be able to change functionality of a particular receptacle from locations in the system apart from the particular receptacle, without physically operating directly upon or replacing the particular receptacle.

It would also be advantageous to have a junction box that provides a low voltage connector block adapted to provide circuitry for an electrical communication path. It would also be advantageous to have an electrical circuitry system wherein electrical receptacles may be controlled via a built-in, internal logic system that can be connected in any location within the system, and subsequently moved to any other location within the system, without affecting ability to be controlled by any suitably configured switch or switch control in the building.

It would also be advantageous to have a system and method for remotely controlling a remotely located device through an electrical circuitry system such that both the controlling device and the controlled device may be connected to any of a multiplicity of receptacles in the electrical circuitry system. It would also be advantageous to have a circuit system and wiring method that permits a single gang electrical junction box to accommodate a switch that is capable of controlling multiple electrical receptacles or groups of such receptacles.

Finally, it would be advantageous to have a circuit system that provides improved electrical junction boxes having a single connection or contact that permits communication, and thereby the capacity to control, monitor, and/or reconfigure electrical receptacles connected to the system from any point within the system. It would also be advantageous to have a method for terminating and routing electrical wires so that full testing of associated circuitry is possible prior to completion of interior wall surfaces. It would also be advantageous to have a junction box that decreases the risk of electrical shock. It would also be advantageous to have an electrical junction box that reduces risks of initiating an electrical fire.

SUMMARY OF THE INVENTION

An electrical wiring system and method disclosed herein overcome the above-described deficiencies of the prior art. According to the invention, a modular "smart" receptacle is employed in a wiring system for providing electrical service to the receptacle permits allows all junction boxes, regardless of their ultimate functionality, to be wired in series. The functionality of the receptacle, which electrically communicates with the junction box, is determined solely by a processor, which is preconfigured (i.e., preset or preprogrammed) to determine at least an original functionality of that specific electric receptacle. Thus any receptacle, in any junction box, wired in series could be a switch, a switched outlet, a switched light or the like without the necessity of wiring a particular junction box in a manner to provide functionality of that receptacle.

The present invention thus provides a building electrical system wherein the modular electrical receptacles need not be fixed in location relative to corresponding switches or switch controls. The circuitry of the present invention allows any junction box regardless of its location in the system to contain a receptacle that can function as any component of the circuit. Thus, for example, switches can be changed from a single-pole utility to one offering three-way utility by merely changing functionality of the receptacle in electrical communication with a junction box.

In accordance with one aspect of the invention, the processor within a receptacle can be preconfigured (i.e., pre-set or programmed prior to installation) so as to avoid requiring exchange of the entire receptacle within the junction box to change functionality of the electrical unit at the desired location. According to another aspect the processors within the receptacle can be re-configured remotely, after installation, either by use of the building electrical circuitry, or by use of a low voltage independent connection.

Thus, electrical receptacles having a specified functionality can be connected in any junction box location within the electrical system, and may be subsequently moved or re-configured to any other location within the system. In accordance with the invention, a single gang electrical junction box can incorporate multiple functionalities, such as ability to control multiple electrical receptacles or groups of such receptacles from a single location or station.

In accordance with one embodiment, an electrical system is capable of multi-configurable functionality via use of a low voltage twisted pair actuating and/or monitoring circuit that permits central control and monitoring of all such electrical receptacles connected to the system. By providing each electrical junction box with a separate low voltage circuit connection that interfaces with an electrical receptacle connected to each junction box, the circuitry system of the present invention permits the flow of information between receptacles, and accordingly, the control and monitoring of that electrical receptacle. By eliminating any requirement for switches to open or close portions of the electrical system to turn off the switched receptacle, the present invention supports continuity of a communication path between all receptacles of the system, thereby facilitating continuous control and/or monitoring of all receptacles connected to the system, regardless of their locations. Accordingly, individual receptacles may be physically relocated within the system without incurring loss of functionality, monitorability, or controllability. In accordance with another aspect of the invention, the system enables use of reconfigurable processors, having internal logic systems that can control any and/or all of the receptacles in a given electrical system.

In accordance with a broad aspect of the invention, an electrical system as defined by the instant invention comprises a plurality of electrical junction boxes wired in series with at least one electrical receptacle in electrical communication with at least one of the electrical junction boxes. The electrical receptacle comprises a processor that is configured to provide a desired functionality to the receptacle. Thus, the electrical receptacle of the instant invention comprises a processor that allows the electrical functionality of the receptacle to be determined irrespective of location or wiring of a junction box with which it electrically communicates. The processor is configurable, preferably remotely, and can provide information to and/or receive information from other receptacles connected to the system. The processor can also enable the receptacle to be re-configured, monitored, or controlled by any suitable receptacle located elsewhere in the system. Alternatively, the receptacle can be configured to re-configure, control, and/or monitor other receptacles of the system, and may perform combinations of these functions.

In accordance with the present invention, the instant electrical wiring system can also employ an electrical junction box that permits electrical wires from an electrical system of a building to terminate at a set of terminal strips and lugs in a secure area of the junction box rather than directly on an electrical receptacle that is mounted on and connected to the junction box. The improved electrical junction box provides a set of plug-and-play electrical terminals into which electrical receptacles plug directly without any need for relatively permanent wiring. Accordingly, electrical receptacles may be plugged directly into improved electrical junction boxes to form electrical service ports, and such receptacles may easily be relocated to form electrical service ports in any other location within the system.

In another embodiment, the electrical junction box encloses a set of at least three conductive terminal strips, including at least one substantially electrically positive terminal strip, at least one substantially electrically negative terminal strip, and at least one substantially electrically neutral terminal strip. The junction box also has a corresponding set of at least three female connecting lugs substantially aligned with and extending outwardly from the corresponding set of conductive terminal strips and adapted to removably matingly engage a corresponding set of at least three male connecting lugs on an electrical receptacle.

Preferably, a security plate having apertures substantially corresponding to the female connecting lugs fits over the female connecting lugs for removable attachment within the interior of the housing to provide a secure substantially enclosed environment within the rear portion of the junction box. Thus, all open electrical contacts within the junction box are separated from the remaining portion of the electrical junction box.

In accordance with another embodiment of the instant electrical junction box, a low voltage cable is installed through an end panel of a base housing, and terminates into a low voltage connector block, which is removably or fixedly attached to the base housing. A non-conductive low voltage barrier separates the low voltage connector block from the remainder of the junction box, thereby separating all standard voltage cables connected to the conductive terminal strips from the low voltage cables connected to the low voltage connector block. The low voltage connector block is adapted to terminate a low voltage cable and receive a control/monitor pigtail from an electrical receptacle mounted on and electrically connected to the electrical junction box, thereby providing a circuit for an electronic communication path. When a control- or monitor-capable electrical receptacle having a control/monitor pigtail is removably inserted into the junction box, the control/monitor pigtail removably interfaces with the low voltage connector block and completes the circuit. In one described embodiment, the low voltage connector block is enclosed behind the above-described security plate and is therefore contained within the rear portion of the junction box. In this embodiment, the security plate further comprises at least one aperture that substantially corresponds to at least one aperture on the low voltage connector block that is adapted to receive the control/monitor pigtail. Thus, when the security plate encloses the low voltage connector block in a rear portion of the junction box, the control/monitor pigtail can removably and matingly engage the low voltage connector block through the security plate.

In the described embodiment, the control/monitor pigtail and the low voltage cable, to which the control/monitor pigtail may be connected through the low voltage connector block, provides a communication path for controlling a remotely located device. Such control of a remotely located device may be accomplished by the connection of an external control unit to a pigtail through one of the receptacles in the system and the connection of a controllable device to the communication circuit through another receptacle and its associated pigtail. In this system, the control unit sends coded electrical signals, which may be in the form of pulses or other encoded information, through the low voltage cabling of the electrical circuitry system. In response to the electrical signals, an electrical device, to which the electrical signals are addressed, though remotely located, is enabled to perform the requested function.

The electrical signals may be analog or digital in nature. As one with ordinary skill in the art appreciates, information may be transmitted through a wire or set of wires using a variety of transmission techniques including, among others, variations in frequency or intensity, which variations may be sensed as an electrical current, or a variation in electrical current, passing through the electrical wiring. The information may also be transmitted as an electrical potential, or as a variation in electrical potential, either applied or sensed, at a location along the wire or circuit. Further, in an exemplary embodiment, both the controlling and the controlled devices may be connected to any of a multiplicity of receptacles in the electrical circuitry system without adversely affecting their respective abilities to control or be controlled. The signals may be received through any of the pigtails in any of the multiplicity of receptacles connected to the system.

Through this system, a user can remotely turn devices on or off, or otherwise modify operation or status of a given device. For example, in the system of the instant invention, an user may manipulate a control connected to a first receptacle and thereby change a channel, or turn-on or turn-off, or adjust the volume, of a television set connected to a second receptacle that may be located in the same or another room of the building so long as the television set is connected to the electrical wiring system and is adapted to receive and respond to the controlling signals. Further, the external control unit that is physically wired to the pigtail may be adapted to be controlled by and/or communicate with another wireless control unit through communication devices such as via an infrared or other frequency signal, light pulses, electromagnetic transmissions including radio or UHF or VHF bands, or even transmissions via telephone, cable, or satellite system.

As one with ordinary skill in the art will appreciate, such a control system and method may be applied to virtually any electrical device that can be connected to an electrical system, and that can be controlled. For example, the system can be used with a home theatre system, a television, a videocassette recorder, an audio system such as a stereo, a video surveillance system, a home security system, a toaster, a stove, oven, or microwave, blender, coffee maker, refrigerator, or any heating, cooling, ventilation, humidification, dehumidification, or purification device, door or window privacy or security activation or deactivation device, and/or any device for providing illumination.

Other features, and advantages of the present invention will become apparent to those skilled in the art based on the following detailed description. It should be understood, however, that the detailed description and specific examples, while described as embodiments of the present invention, are provided for purposes of illustration and not limitation. Many changes and modifications within the scope of the present invention may be made without departing from the spirit thereof, and the invention shall be deemed to include all such modifications.

BRIEF DESCRIPTION OF DRAWINGS

The above and further aspects of the invention will become more readily apparent as the invention is more fully understood from the detailed description to follow, with reference being made to the accompanying drawings in which like reference numerals represent like parts throughout and in which:

FIG. 5A is a high-level connectivity diagram showing a plurality of electrical junction boxes wired in series with both a remote controlling device and remotely controlled devices.

FIG. 5B is an alternate embodiment of a junction box having a modular construction that is incorporated in the system of FIG. 5A.

DETAILED DESCRIPTION OF EMBODIMENTS

Figure 1:
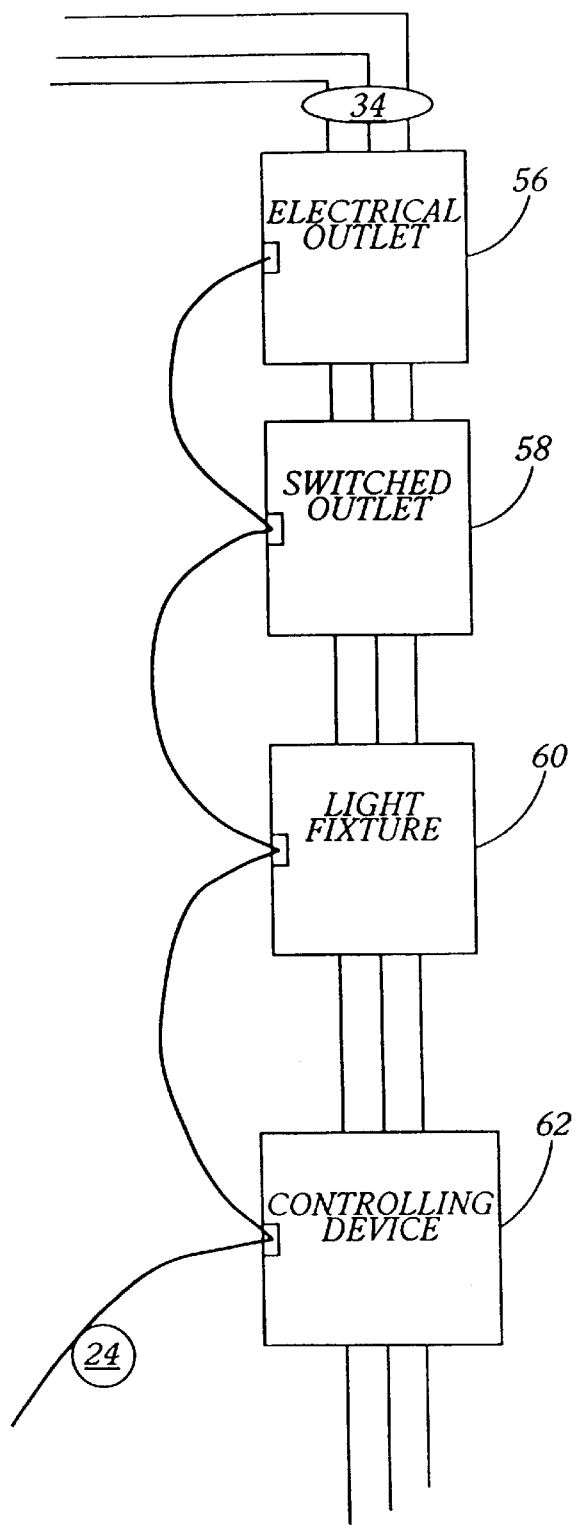
FIG. 1 is a high-level connectivity diagram showing a plurality of electrical junction boxes wired in series having re-configurable receptacles.

This invention provides the ability to monitor, control, or change the functionality of either a single electrical receptacle or a plurality of electrical receptacles that are connected in series in an electrical system of a building. The invention also enables the location and/or functionality of each monitored, controlled, monitoring, or controlling receptacle to be changed at any time without rewiring. Because the system of the instant invention accomplishes switching on or off within each individual receptacle, it is unnecessary to open the circuit as is required, for example, in a conventionally wired light circuit. As a result, the wiring of the instant system remains available for communication regardless of the on or off status of individual receptacles, and receptacles may communicate with other receptacles in the instant system by sending or receiving signals through the high voltage wiring. Alternatively, receptacles may employ additional low voltage wiring in addition to the high voltage cable.

The electrical junction boxes of the instant invention comprises a housing for enclosing the components of the electrical junction boxes and for fastening or attaching the electrical junction boxes to a building structure. Although conventional wiring junction boxes can be used in accordance with the instant invention, preferably the housing encloses at least two conductive terminal strips that are insulated one from the other by a non-conductive barrier. Each conductive terminal strip has at least two terminal connecting lugs fixedly or removably attached in spaced apart relation along the conductive terminal strip. The terminal connecting lugs on the conductive terminal strips provide termination points for standard 600V sheathed cable. A set of at least two female connecting lugs is substantially aligned with and extends outwardly from a corresponding set of at least two conductive terminal strips. The female connecting lugs provide a plug-and-play type interface that is adapted to matingly engage a corresponding set of at least two male connecting lugs on an electrical receptacle for electrically connecting an electrical receptacle to the electrical junction box. The electrical receptacle comprises a set of at least two male connecting lugs for removably inserting the electrical receptacle into the corresponding female connecting lugs. In the case of a fixedly attached electrical device such as a light fixture or a ceiling fan, for example, the electrical device is wired to a receptacle adapter, and the set of at least two male connecting lugs on the receptacle adapter is removably inserted into the corresponding set of at least two female connecting lugs on the junction box. Thus, when the male connecting lugs of a receptacle or receptacle adapter on an electrical device are matingly engaged with or inserted into the female connecting lugs, the male connecting lugs are electrically connected to the set of conductive terminal strips in the junction box, thereby electrically connecting the receptacle or electrical device connected to a receptacle adapter to a building's electrical power supply.

Turning to FIG. 1, a high-level connectivity diagram shows a plurality of electrical receptacles wired in series. The instant electrical junction box provides that all electrical receptacles are similarly wired and are therefore capable of being plugged into the junction box, regardless of the type of receptacle. In one embodiment, each identically wired electrical receptacle is removably inserted or plugged into its respective junction box, which is wired in series and connected to up to eight non-switch electrical receptacles on a single circuit. As described below with reference to FIGS. 3 and 4, in this embodiment, when a plurality of electrical junction boxes are wired in series, standard 600V sheathed cable 34 is installed in the junction box 10 through an end panel 18 of the housing 12, connects to the conductive terminal strips 28, and extends from the junction box 10 through an opposing end panel 18 of the housing 12 for continuation of the electrical circuit and connection to the next junction box 10 in the series. In another aspect of the invention, described below with reference to FIGS. 3 and 4, low voltage cable 24 is installed in the junction box 10 through an end panel 18 of the housing member 12, connects to the low voltage connector block 44, and exits the junction box 10 through the opposing end panel 18 of the housing member 12 for continuation of the circuit and connection to the next junction box in the series.

As shown schematically in FIG. 1, examples of the variety of electrical receptacles that can be connected to the junction box and wired in series include electrical receptacle 56, which can be a standard electrical outlet; electrical receptacle 58, which can be a switched outlet; electrical receptacle 60 which can be adapted to accommodate a light fixture; and electrical receptacle 62 which can be a controlling receptacle, such as, for example, a touch pad that is configured to control both electrical receptacle 60 and electrical receptacle 58 individually or an electrical switch that is specifically configured to control electrical receptacle 58. The standard voltage cable 34 passes through each electrical receptacle in series, thereby providing electrical power to all receptacles 56, 58, 60, and 62 on the circuit. Specific control of the electrical power provided to each receptacle, such as whether the receptacle is turned on or off, is managed by each receptacle individually. If an electrical receptacle is a controllable receptacle, such as for example a switched outlet 58 or a light fixture 60, input from a controlling receptacle, such as for example touch pad or switch 62, is required to change the state (i.e., on/off stepped functionality, dim/bright ramped functionality, or intermittent/flash timed functionality) of the controllable receptacles 58 or 60. Controlling receptacles, such as touch pad or switch 62, are not hardwired directly to the receptacles they control, and control is not dependent upon determining whether or not a complete electrical circuit is connected to the receptacle being controlled.

Figure 2:
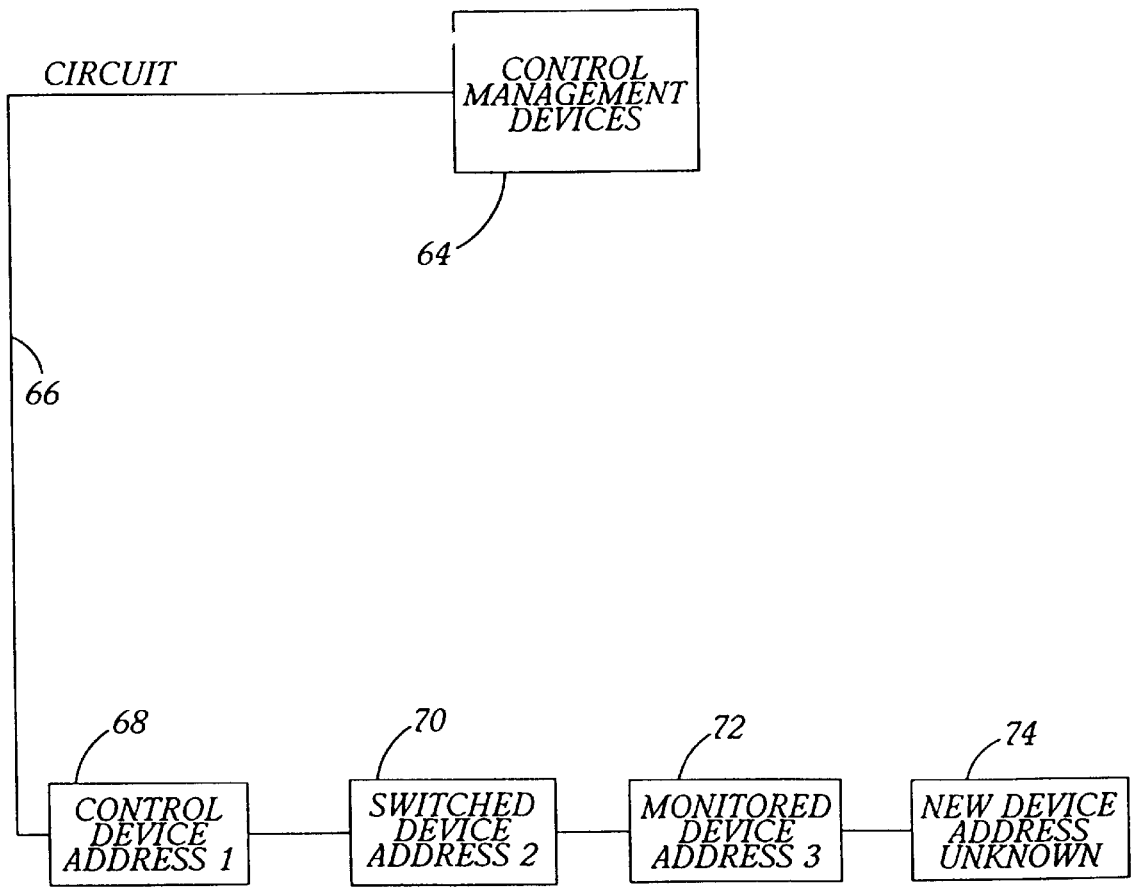
FIG. 2 is a flow diagram showing how both controlling and controlled receptacles communicate through the circuitry of the instant invention.

The system of the present invention employs a circuit that provides a communications path between and among all electrical receptacles, including outlets, switches, controls, sensors, detectors, fixtures, appliances, and other electrical devices electrically connected to the system. The circuit of the instant invention is illustrated in FIG. 2, which is a high-level view of the manner in which the circuit 66 connects, in series, management receptacle 64 to controllable or monitored receptacles 68, 70, 72, 74. Management receptacle 64 and receptacles 68, 70, 72, and 74 are all connected to the system by being mounted on and connected to an improved, plug-and-play electrical junction box. When a device having an electrical receptacle, as shown and described with reference to FIG. 1, is mounted on and connected to an improved junction box in accordance with the invention, it is also installed and connected to the circuit 66. Once a receptacle or receptacles is connected to circuit 66, the system assigns that receptacle a unique address and determines whether it is a controlling, controllable, or monitored receptacle. The electrical receptacle connected to the electrical device has its own internal logic. That internal logic allows the receptacle to control other receptacles, be controlled by other receptacles, and/or be monitored by other receptacles. When a new receptacle is added to the circuit 66 that new receptacle initially triggers an unknown address, and the system broadcasts that there is a new receptacle on the network that requires an address assignment. The management receptacle 64 then assigns the next available address in the series to the new receptacle, and the system thereafter defines the receptacle by a unique name and location. Alternatively, each receptacle can be preconfigured with an address similar to today's computer networking equipment, as will be appreciated by those skilled in the art.

Control of a particular receptacle that is integrated into the system can be accomplished in a number of ways. For example, the management receptacle 64 can direct a receptacle, either at a user's request or automatically based on a series of events, to change its state (i.e., on/off stepped functionality, dim/bright ramped functionality, or intermittent/flash timed functionality). Also, control receptacle 68 can be configured to control either single or multiple controllable receptacles 70. The management receptacle 64 is also able to monitor any controllable, controlling, or monitored receptacle, which allows the management receptacle 64 to know a receptacle's current state and/or whether power is being consumed through the receptacle.

Figure 3:
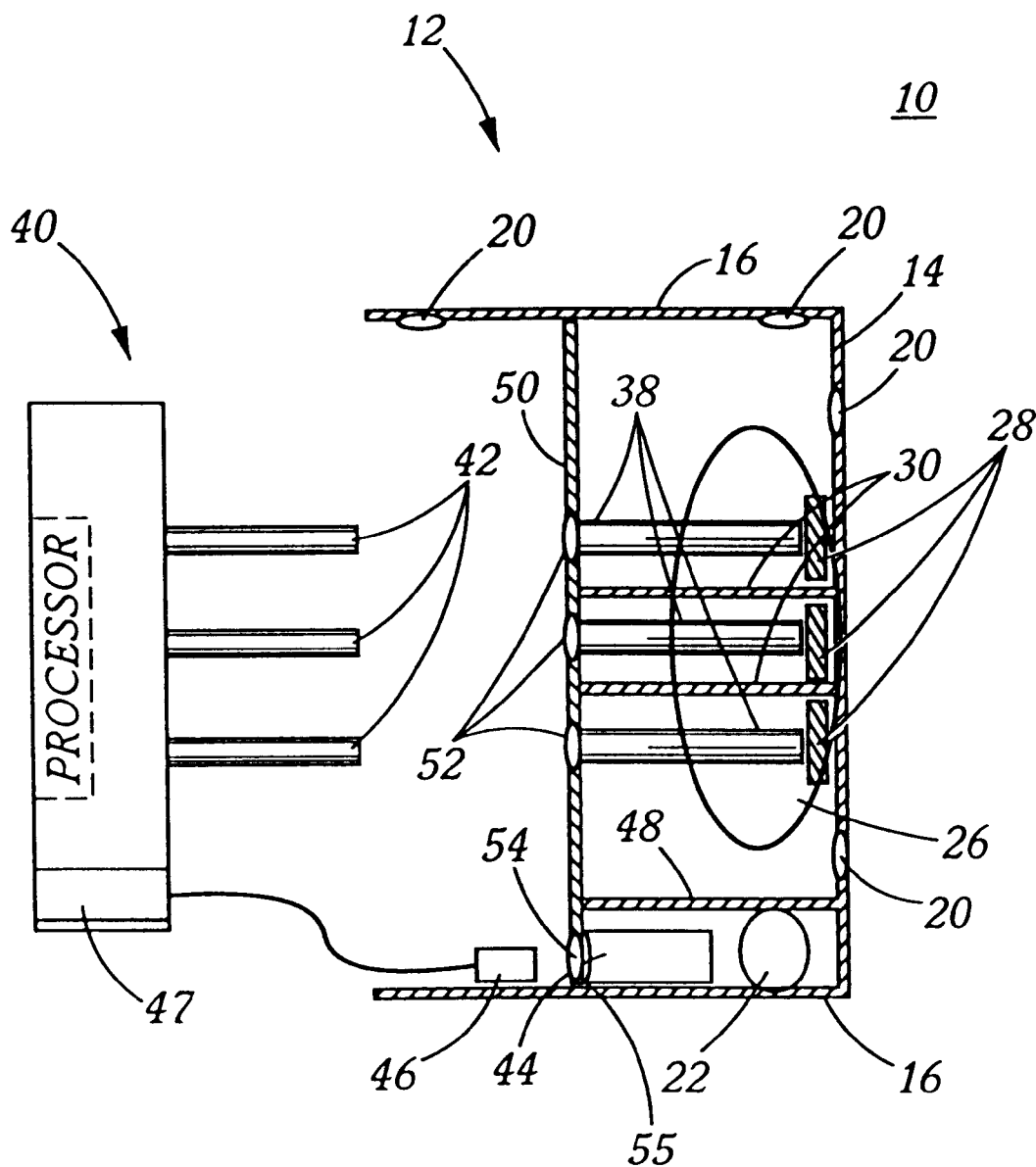
FIG. 3 is a cross-sectional top view of one described embodiment of an electrical junction box of the instant invention.
Figure 4:
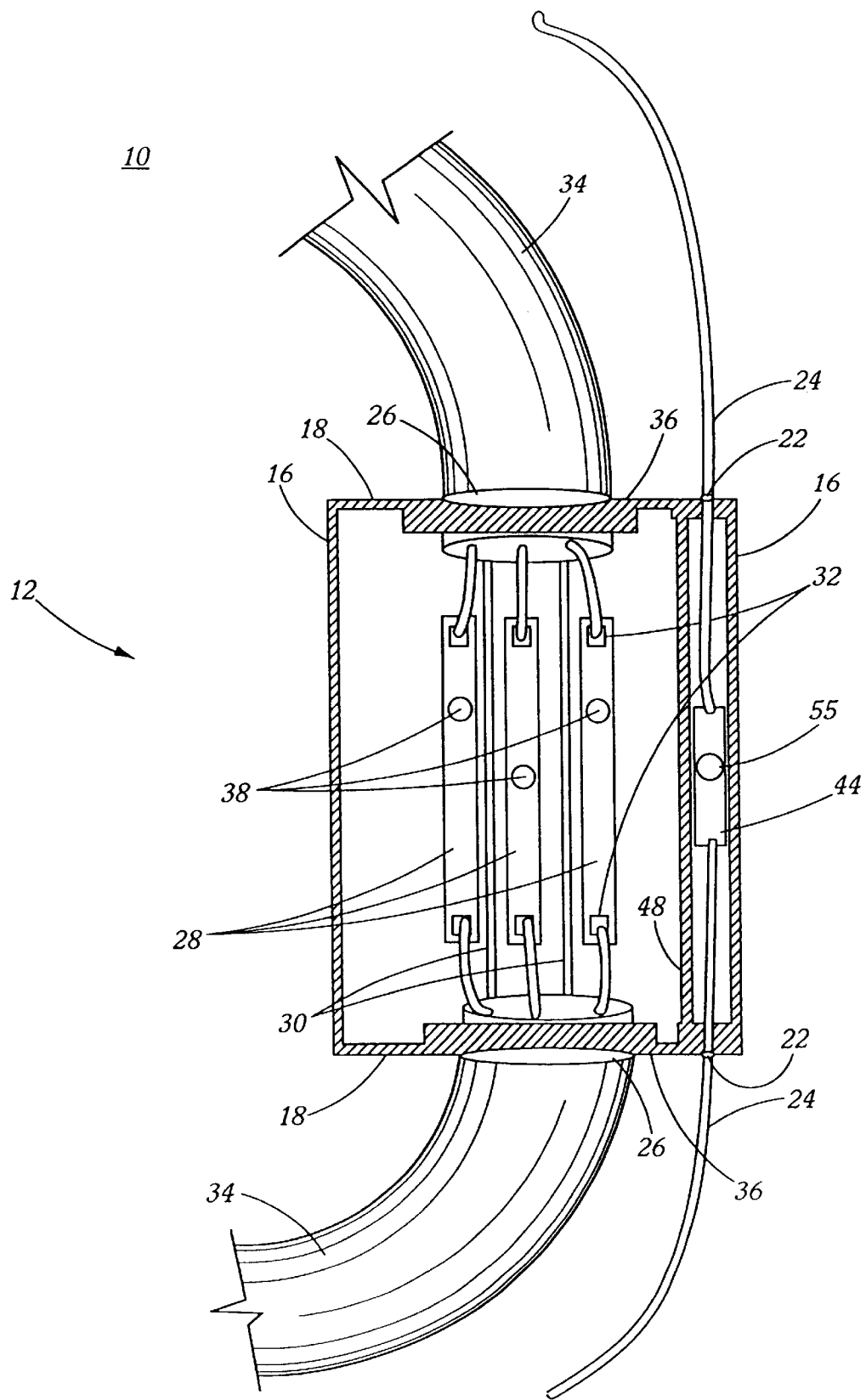
FIG. 4 is a frontal view of the embodiment of the electrical junction box of FIG. 3, without a security plate.

Turning now to FIGS. 3 and 4, the overall structure of the improved electrical junction box 10 is illustrated. As shown in FIG. 3, the improved electrical junction box 10 comprises a housing or box member 12 which further comprises a rear panel 14 which can be square, rectangular, or any other suitable shape. A spaced, substantially parallel, opposed pair of side panels 16 extends outward from and substantially perpendicular to the rear panel 14, and a spaced, substantially parallel, opposed pair of end panels 18 extends outward from and substantially perpendicular to the rear panel 14 and bridges the side panels 16 to provide a partially enclosed space there between. There is at least one aperture or hole 20 in the rear panel 14 and/or in the side panels 16 adapted to receive fastener for mounting the junction box 10 to a suitable surface of a building structure, such as a framing member or framing stud, for example. These apertures may be formed through the rear panel 14 and/or the side panels 16, or may be formed as keyhole tabs that extend from the peripheral edges of the rear panel 14 and/or the side panels 16. In one embodiment, at least one electrical wire or cable aperture or opening 22 is formed through each of the end panels 18, preferably disposed toward the rear panel 14 and near or along one side of the housing or box member 12, and adapted to receive electrical wires or cables, such as, for example, low voltage cable 24. Cable is installed into and from the junction box 10 at cable apertures 26 which are disposed toward the center of both end panels 18 of the box member 12.

The box member 12 of the electrical junction box 10 can be made of plastic or any other suitable, non-conductive material. The fastener for mounting the junction box to a building surface structure are preferably screws but can be any suitable fastener known and practiced by one of ordinary skill in the art.

The box member 12 of the instant junction box 10 contains a set of three conductive terminal strips 28 that are insulated one from the other by a non-conductive barrier 30. The non-conductive barrier 30 can be made of plastic or any other suitable material as known and practiced in the art. Each conductive terminal strip 28 further comprises a pair of terminal connecting lugs 32 fixedly attached in spaced apart relation along the conductive terminal strip 28, which provides for the termination of standard 600V sheathed cable 34. Wire clamp 36 adjacent the cable passage apertures 26 are fixedly attached to the end panels 18 for insuring that the standard 600V sheathed cable 34 is not inadvertently pulled out of the electrical junction box 10. A set of three female connecting lugs 38 provides a plug-and-play type interface to connect electrical receptacle 40 to the conductive terminal strips 28 via male connecting lugs 42. The electrical receptacle has a set of three male connecting lugs 42 for removably inserting the electrical receptacle 40 into the corresponding female connecting lugs 38. The electrical receptacle 40 also contains an external pigtail interface connection 47 for connecting an external control to the pigtail or for connecting and external controllable device to the pigtail. The electrical receptacle 40 can be, for example, an electrical outlet, an electrical switch, a switched electrical outlet, a fixture, an electrical appliance, or the like. In another aspect of the instant electrical junction box 10, low voltage cable 24 is installed in the junction box 10 through electrical cable aperture 22 in end panel 18, terminates into low voltage connector block 44, and exits through cable aperture 22 in the opposing end panel 18 to provide a circuit for an electrical communications path. If electrical receptacle 40 is control- or monitor-capable, low voltage connector block 44 is adapted to interface removably with or removably receive a control/monitor pigtail 46 on electrical receptacle 40 to complete a circuit through low voltage cable 24. A non-conductive low voltage barrier 48 separates the low voltage connector block 44 from the remainder of the junction box 10, thereby separating all standard voltage cables 34 connected to the conductive terminal strips 28 from the low voltage cable 24 connected to the low voltage connector block 44. The non-conductive low voltage barrier 48 can be made of plastic or any other suitable material as known and practiced by one of ordinary skill in the art. A security plate 50, having apertures 52 corresponding to the female connecting lugs 38 and aperture 54 corresponding to an aperture or opening 55 in low voltage connector block 44, fits into the box member 12. The security plate 50 fits over, or in front of, the female connecting lugs 38 and the low voltage connector block 44 and removably attaches to the side panels 16 and end panels 18 of the housing 12 to provide a secure, enclosed environment within the rear portion of the junction box 10 which thereby contains all open electrical contacts.

The plug-and-play features of the improved electrical junction box and the circuitry of the present system enable the system to be easily customized and modified without requiring either rewiring or that the user have extensive electrical knowledge. For example, if a room has a wall switch that is configured to control a particular electrical receptacle, such as, for example, a switched outlet or an electrical device attached to a receptacle or the like, and the building's owner or user determines that the electrical receptacle would be more convenient if it were placed on another wall or in any other location within the improved wiring system, the improved electrical junction box and circuitry of the present invention permits the electrical receptacle to be unplugged from its original junction box and exchanged with the electrical receptacle at a second junction box. Unlike current electrical wiring practices, the building's owner or user does not have to hire an electrician to rewire the room. The switch control logic is built into the electrical receptacle connected to the device and is not a function of hardwiring the device to the junction box. Thus, the electrical receptacle and the electrical device connected to the electrical receptacle are configured to be controlled by the original wall switch receptacle and will continue to be so controlled even when the device, with its receptacle, is moved to another junction box. The same would be the case for lighting fixtures, ceiling fans, and other types of devices where controllability through the wiring system is advantageous. All of the receptacles within the system of the instant invention are movable, and their functionality and the manner in which they are configured necessarily moves with them. All receptacle configurations (i.e., programs) are readily altered or modified. For example, a switch that currently controls only one light easily can be re-configured to control multiple lights in different areas of the house. The same switch is also capable of being moved to a different room in the house. The present system simplifies the rearrangement of electrical receptacles, such as fixtures, switches, and outlets for example, and also permits monitoring and management of those electrical receptacles from any point in the system. In one embodiment, the present system enables monitoring, control, re-configuring, and/or management of any or all of the electrical receptacles from other electrical receptacles in electrical communication with the system.

In the instant invention, an electrical receptacle combines with an electrical junction box to provide an electrical service port, through which an individual may gain access to electrical service such as by plugging in an electrical toaster or another electrical device. In the instant invention, an electrical receptacle provides the functionality of the electrical service port; an electrical junction box provides the location of the electrical service port; and the series wiring of the electrical junction boxes provides the electrical communication path between and among the electrical service ports.

The system of the instant invention can include one or more of the following electrical receptacles.

Management unit—This can be, for example, a TV-top unit having remote control capability. The management unit Interfaces with the circuitry via a pass-through interface on a wall outlet faceplate via low voltage cable. This unit can display a listing of all controllable receptacles in the building. It provides an interface for describing, configuring, and/or controlling each electrical receptacle connected to the system. It also recognizes when a new receptacle has been added to the network and asks for user input of relevant information about the new receptacle.

Computer interface—Interfaces with circuitry via a pass-through interface on a wall outlet faceplate via low voltage cable. This interface consists of a computer based software application that can display a listing of all controllable receptacles in the building. It provides an interface for describing, configuring, and controlling each electrical receptacle connected to the system.

Security Interface—This permits a security system to interface with the system's circuitry, optionally via low voltage cable. The security interface allows for monitoring alerts and problems identified in the system. For example, if a stove is left on for an extended period of time, the circuitry and control interface can shut down power to the stove and send an alarm to the security system to notify the building's owner or user.

Automation Interface—This allows a building's automation system to interface with the system's circuitry, optionally via low voltage cable. The automation interface permits the use of triggers to establish or set off a series of events. For example, the automation system could be configured to allow actuation of the "play" button on a VCR to trigger the system to dim the lights in the entertainment room to a pre-defined setting.

Non-Plug and Play Interface—This is a device that adapts communication signals that pass through the high or low voltage network of the instant invention to a communication system that is known to any external device. Thus the device converts commands sent through the network to infrared signals for a TV or other electronic appliance, for example.

Monitorable Service Outlet—This is a standard service outlet that is may be designed to interface with the improved electrical junction box via the plug-and-play terminal strips and connecting lugs of the junction box. The monitorable service outlet is not necessarily a controllable receptacle, nor is it necessarily in two-way communication with the system's circuitry. However, the monitorable service outlet can interface with a monitoring receptacle to determine, for example, how much power is being consumed through the particular service outlet, or whether the particular service outlet has an amperage draw on it, or what it's temperature is, or any other parameter that would be useful in maintaining the utility or safety of the particular service outlet. Additionally, this service outlet can be configured as a Ground Fault Interrupter ("GFI") service outlet.

Switched Service Outlet—This outlet is designed to interface with the improved electrical junction box via the plug-and-play terminal strips and connecting lugs on the junction box. The switched service outlet interfaces with the circuit, is addressable and controllable by any designated circuit control receptacle, and has full monitoring capabilities. The switched service outlet can be controlled by, for example, a switch, an automation receptacle, a security system, a management unit, or a computer. Additionally, this service outlet can be configured as a GFI service outlet.

Service Switch—This is a standard type service switch that is designed to interface with the improved electrical junction box via the plug-and-play terminal strips and connecting lugs on the junction box. The service switch can interface with the circuit and is addressable, controlling, and controllable from any circuit control receptacle as well as capable of full monitoring by, for example, an automation receptacle, a security system, a management unit, or a computer.

Multi-Control Switch—This is a controlling unit that is designed to interface with the improved electrical junction box via the plug-and-play terminal strips and connecting lugs on the junction box. It also interfaces with the circuit and is addressable, controlling, and controllable from any circuit control receptacle as well as capable of full monitoring by, for example, an automation receptacle, a security system, a management unit, or a computer. The switch can have a pushbutton type interface or a touch-screen type interface.

Electrical Receptacle Adapter—This is a module that is designed to interface with and adapt electrical receptacles such as, for example, light fixtures and ceiling fans, to the improved electrical junction box via the plug-and-play terminal strips and connecting lugs on the junction box. The electrical receptacle adapter interfaces with the circuit and is addressable and controllable from any circuit control receptacle as well as capable of full monitoring by, for example, a switch, an automation receptacle, a security system, a management unit, or a computer.

Detection Receptacle—A smoke detector or other detection receptacle that is designed to detect the presence of a particular substance or class of substances and to interface with the improved electrical junction box via the plug-and-play terminal strips and connecting lugs on the junction box. Fire alarm circuitry can interface with the system's circuitry for full monitoring and communications capability.

Sensing Receptacle—A temperature, pressure or other sensing receptacle that is designed to quantify the status of an environment and to interface with the improved electrical junction box via the plug-and-play terminal strips and connecting lugs on the junction box. Environmental control circuitry can interface with the system's circuitry for full monitoring and communications capability.

Network Receptacle—This is a plug and play Ethernet hub or Switch that converts communication from a network created by the present invention to standard Ethernet communication signals that can be passed along to any Ethernet compatible device.

FIG. 5A displays an example of an electrical in-home control system that incorporates a plurality of smart modular control receptacles 40 of the type displayed in FIG. 5B. In the displayed embodiment, three receptacles 40 are employed in the system as outlets having external low voltage interfaces with a low voltage cable 24. For this purpose, an interface connection 47 is defined via a control/monitor pigtail through the low voltage cable 24, and communicates by means of a low voltage connector block to be described. The system provides an effective communication path for electrical control of remotely located devices, including a pair of controllable light fixtures 45, a wall switch 51, and a controllable outlet 57.

As characterized in FIG. 5A, such control of remotely located devices may be accomplished via connection of an external control system 80 by a first external wire 81 to an external pigtail interface connection 47 (FIG. 5B) in one of the receptacles 40 of the system. The connection of such a controllable external device, such as a TV 82, is established via a second external wire 83, and may be made through an external pigtail interface connection 47 in yet another receptacle 40. In this system, the control system 80 launches coded electrical signals that may be in the form of pulses, or any other encoded information, through the low voltage cable 24 of the electrical circuitry system. In response to the electrical signals, the electrical device 82, to which the electrical signals are addressed, performs the requested function, even though remotely located. Obviously, the TV may be independently controlled via a conventional hand-held infrared remote controller 63, as will be appreciated by those skilled in the art.

The electrical signals may be analog or digital in nature. As one with ordinary skill in the art appreciates, information may be transmitted through a wire or set of wires using a variety of transmission devices including, among others, variations in frequency or intensity, which variations may be sensed as an electrical current, or a variation in electrical current, passing through the electrical wiring. The information may also be transmitted as an electrical potential, or a variation in electrical potential, either applied or sensed, at a location on the wire or circuit. Further, in an exemplary embodiment, both the controlling and the controlled devices may be connected to any of a multiplicity of receptacles in the electrical circuitry system without adversely affecting their respective abilities to control or be controlled. The signals may be received through any of the pigtails in any of the multiplicity of receptacles connected to the system. Finally, system versatility is enhanced as result of complete independence of operation between high and low voltage sides of any given receptacle. Indeed, to the extent that any given receptacle is equipped to tap independently into high and low voltage cabling, it is actually not necessary that each connector block of every receptacle 40 of a given system (e.g., FIG. 5) include both high and low voltage capabilities.

Through this system, a user can remotely turn devices on or off, or otherwise modify the device's operation or status. For example, in the system of the instant invention, an user may manipulate a control connected to a first receptacle and thereby change the channel of, or turn-on or turn-off, or adjust the volume of, a television set connected to a second receptacle that may be located in the same or another room of the building so long as the television set is connected to the electrical wiring system and is adapted to receive and respond to the controlling signals. Further, the external control unit that is physically wired to the pigtail may be adapted to be controlled by and/or communicate with another wireless control unit through communication devices such as such as infrared, or other frequencies, light pulses, electromagnetic transmission such as radio or UHF or VHF bands or even transmission via telephone system or cable system or satellite system.

As one with ordinary skill in the art appreciates, such a control system and method may be applied to virtually any electrical device that can be connected to an electrical system and that can be adapted to be controlled. For example, the system can be used to control a home theatre system, a television, a videocassette recorder, an audio system such as a stereo, a video surveillance system, a home security system, a toaster, a stove or oven or microwave oven, a blender, a coffee maker, a refrigerator, any heating, cooling, ventilation, humidification, dehumidification, or purification device, a door or window or privacy or security activation or deactivation device, a device for generating electricity, and/or any device for providing illumination. The control can be any device adapted to emit a control signal and may include a microprocessor and may be adapted to perform logical functions and may even be a personal computer or a mainframe computer or even a computer network.

All the above-mentioned receptacles and devices also can be built using the CE bus standard, or adapted to accommodate the LonWorks or LonTalk protocol available from the Echelon Corporation, for communications, in addition to or instead of the circuitry of the instant invention.

Figure 6A:
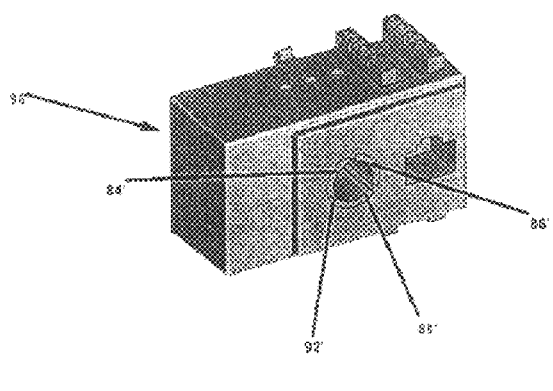
FIG. 6A is a medially insulated single-pronged female connector adapted to receive a corresponding single-pronged male connector.
Figure 6B:
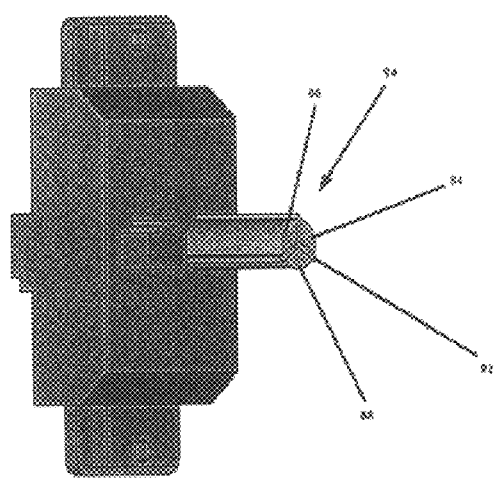
FIG. 6B is a corresponding single-prong male connector having medially insulated electrically positive and negative sides adapted to mate with the female connector of FIG. 6A.

A modified embodiment of the high-voltage side of the present invention is reflected in FIGS. 6A and B, which fragmentarily display a single, unitary male connector 94 adapted for electrically engaging a corresponding single female connector 96. Those skilled in the art will appreciate that the male connector 94 is segmented, and is thus defined by a medially insulated prong including at least a first electrically positive segment 84 and a second electrically negative segment 86. Although the connector 94 will have at least a positive and a negative segment, the connector 94 also includes a ground segment 88.

The male connector 94 is adapted to removably, matingly, and retentively engage the medially insulated female connector 96. Each segment is separated in both corresponding male and female connectors 94, 96 via longitudinally extending insulation strips 92, each strip adhesively bonded to secure adjacent segments together at the time of manufacture. Those skilled in the art will appreciate that the segments 84, 86, 88, of the male connector are adapted to engage corresponding segments 84', 86', 88' of the female connector. The segments 84', 86', 88' define a medially insulated receptor portion of the female connector 96. Further, the connector 96 is attached at its rear end 90 to respective positive, negative, and ground terminal strips 28 shown in FIGS. 3 and 4.

Figure 7:
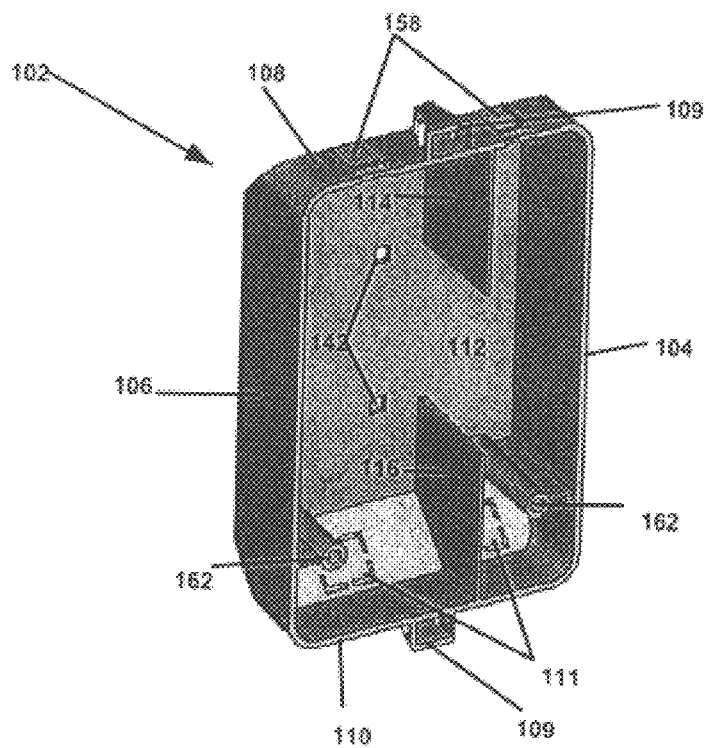
FIG. 7 is a perspective view of a base housing of a junction box constructed in accordance with one embodiment with of the present invention.

A further aspect of the present invention may now be described with reference to FIGS. 7–10. Referring initially to FIG. 7, a modular junction box 100 (FIG. 10) is formed of a base housing 102 (FIG. 7) defined by a set of rectangularly arranged sidewalls 104 and 106, top wall 108, and bottom wall 110. Each of the described walls is attached or otherwise rigidly secured to a rear panel 112. A pair of mounting connectors 109 are fixed to the top wall 108 and bottom wall I 10. Each is used for mounting the box to a house or building structure through a diagonal insertion of a nail. A set of four knock-outs 111 (only the bottom two are shown) allows passage of high and low voltage wires into their respective section of the box for termination at the high or low voltage portions of the termination block 120.

Figure 8:
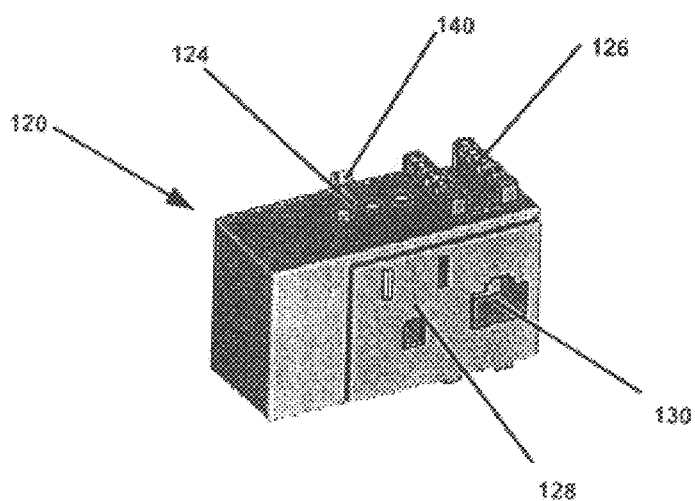
FIG. 8 is a high and low voltage termination block adapted for insertion into the base housing of FIG. 7.

A pair of spaced interior wall segments 114, 116 are attached to, and extend respectively from, top and bottom walls 108, 110 to create (with sidewalls 104, 106) a locator mechanism for installation into the housing 102 of a termination block 120, shown in FIG. 8. The locator mechanism acts as a separator barrier between the high and low voltage areas of the junction box. The block 120 is adapted to be installed into the spacing between the interior wall segments 114, 116, and to be bracketed and/or laterally retained within the housing by walls 104,106.

Those skilled in the art will appreciate that the termination block 120 includes high and low voltage termination portions 124, 126, respectively, on each side thereof. A conventional modular-style three-pronged female electrical connector 128 characterizes the high-voltage portion 124, while an RJ-style female adapter 130, of the type commonly used for phone or network connections, characterizes the low voltage portion 126. The RJ-style connector in the modular junction box 100, i.e. in the presently described embodiment, is used in lieu of the pigtail-style low voltage connection previously described and displayed in FIGS. 3 and 4.

An additional characterizing feature of the connection between the base housing 102 and the termination block 120 is a coupling mechanism of the hook and latch type. For this purpose, a pair of tabs 140 (only one tab is visible) extends from the rear of the termination block 120. The tabs are adapted to engage apertures 142 in the rear panel 112 of the base housing 102 to assure full mechanical retention of the block 120 to the housing 102.

Figure 9:
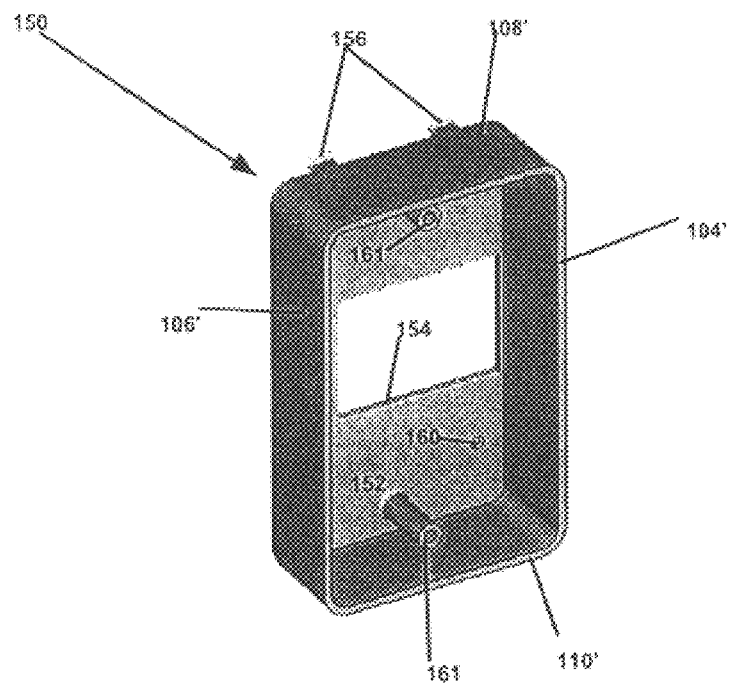
FIG. 9 is a housing cover adapted for installation over the base housing after the termination block has been inserted thereinto.

Once the block 120 has been installed and secured to the housing 102, a housing cover 150, displayed in FIG. 9, is adapted to be installed over both the housing 102 and the termination block 120. The housing cover 150 has a pair of mating corresponding sidewalls 104', 106', along with corresponding top and bottom walls 108' and 110', for this purpose. The cover 150 also includes a face cover panel 152 that includes a face cutout portion 154 to provide full access to the face of the block 120.

Figure 10:
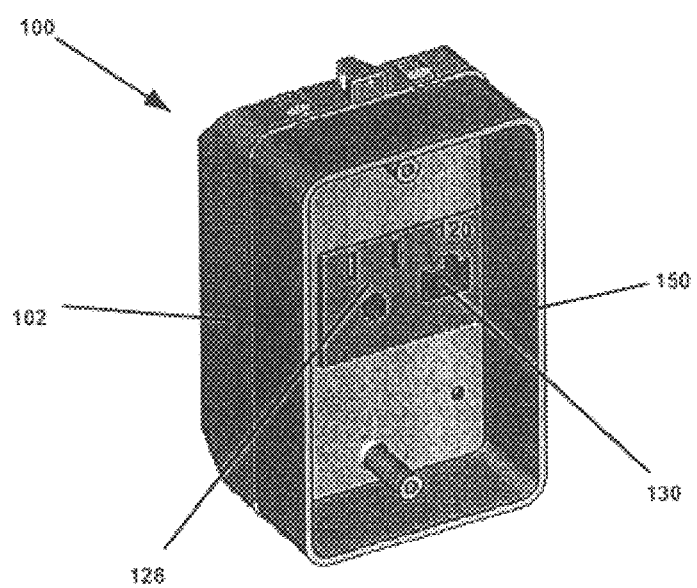
FIG. 10 is a fully completed junction box subassembly, comprised of the base housing, termination block, and housing cover.

Furthermore, it will be appreciated that a pair of tabs 156 extends from the rear of the top wall 108' of the housing cover 150. A pair of mating apertures or slots 158 formed in the top wall 108 of the housing 102 corresponds to the tabs 156; each slot is adapted to be engaged by the tabs 156 for securement of the cover 150 to the housing 102. Once the tabs are fully engaged in the apertures 158, screws (not shown) are inserted through another set of apertures 160 in the face cover panel 152. The apertures 160 accommodate insertion and securement into bosses 162 frontally protruding from the rear panel 112 of the housing 102. This completes the construction sequence of the modular junction box subassembly 100 as shown in FIG. 10.

Figure 11:
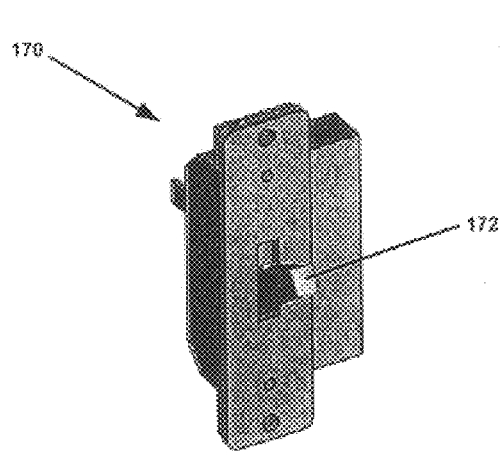
FIG. 11 is an electrical plug and play modular switch unit adapted for insertion into the junction box of FIG. 10.
Figure 12:
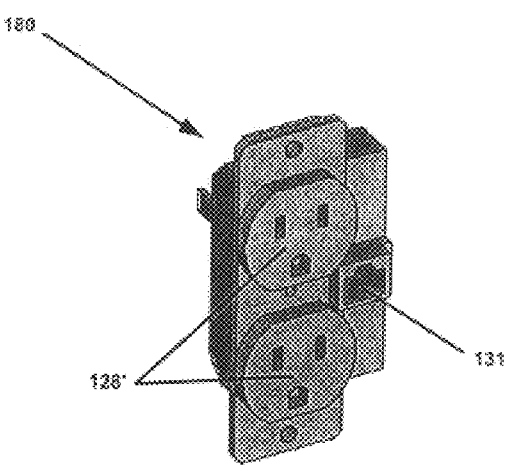
FIG. 12 is an electrical plug and play module comprising a pair of high-voltage outlets with an adjoining low voltage pass through connector adapted to receive and transmit communication and control signals to devices external to the system.
Figure 13:
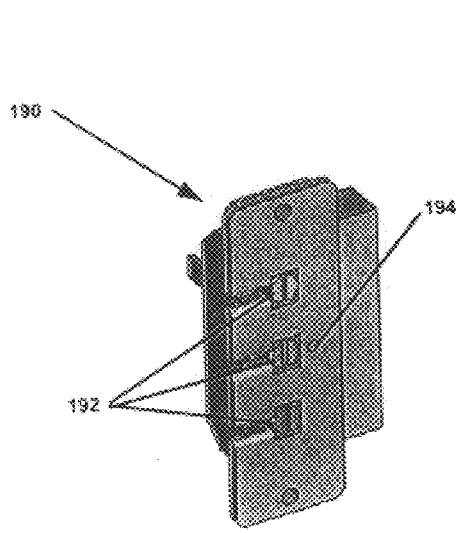
FIG. 13 is an electrical plug and play module designed to adapt non plug and play devices to the junction box of FIG. 10.

Referring now to FIGS. 11, 12, 13, a set of plug and play devices 170, 180 and 190 are shown, respectively. A plug and play electrical switch assembly 170 is depicted in FIG. 11, while a plug and play outlet assembly 180 that includes a pair of high-voltage female electrical outlets and a pass through low voltage RJ-style low voltage female connector 131' is displayed in FIG. 12. The switch assembly 170 incorporates a conventional toggle 172 adapted to switch an electrical connection between on and off positions. The plug and play outlet assembly 180 incorporates a pair of three-pronged female outlets 128' that are similar to the three-pronged female outlet 128 of the termination block 120. The plug and play to non plug and play adapter 190 incorporates a set of high voltage termination lugs to adapt non plug and play wired devices such as a light fixture to present invention's wiring system. Indeed, the plug and play assemblies 170, 180, and 190 are adapted to receive electrical power or control/monitor signals from the block 120.

The assembly 180 also comprises an RJ-style female connector 131' similar to the female connector 130 of the block 120. The connector 131' corresponds to the low voltage side of the block 120, as will be appreciated by those skilled in the art. Such a low voltage connection capability facilitates communication and or control signals between the plug and play units from one receptacle to another, and from one junction box to the next, in a series system that includes a plurality of junction boxes as previously described in reference to FIGS. 1 and 2.

Figure 14:
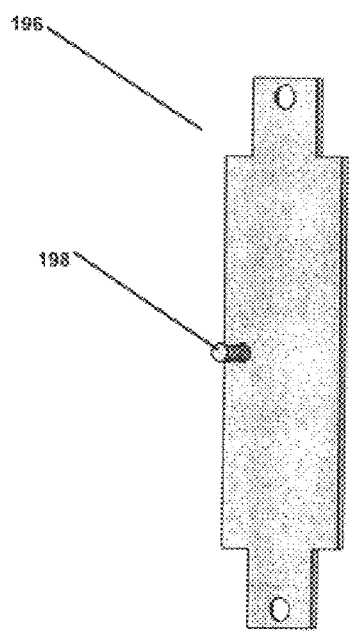
FIG. 14 is a safety cover designed to protect the user from the high voltage termination points of FIG. 13. It is equipped with a plunger which triggers a safety switch in FIG 13.

FIG. 14 shows a security cover 196 designed to cover the high voltage termination lugs of the non plug and play adapter 190. The security cover 196 also contains a plunger 198 that engages the safety switch 194 of the non plug and play adapter 190 to disable power when removed.

Figure 15:
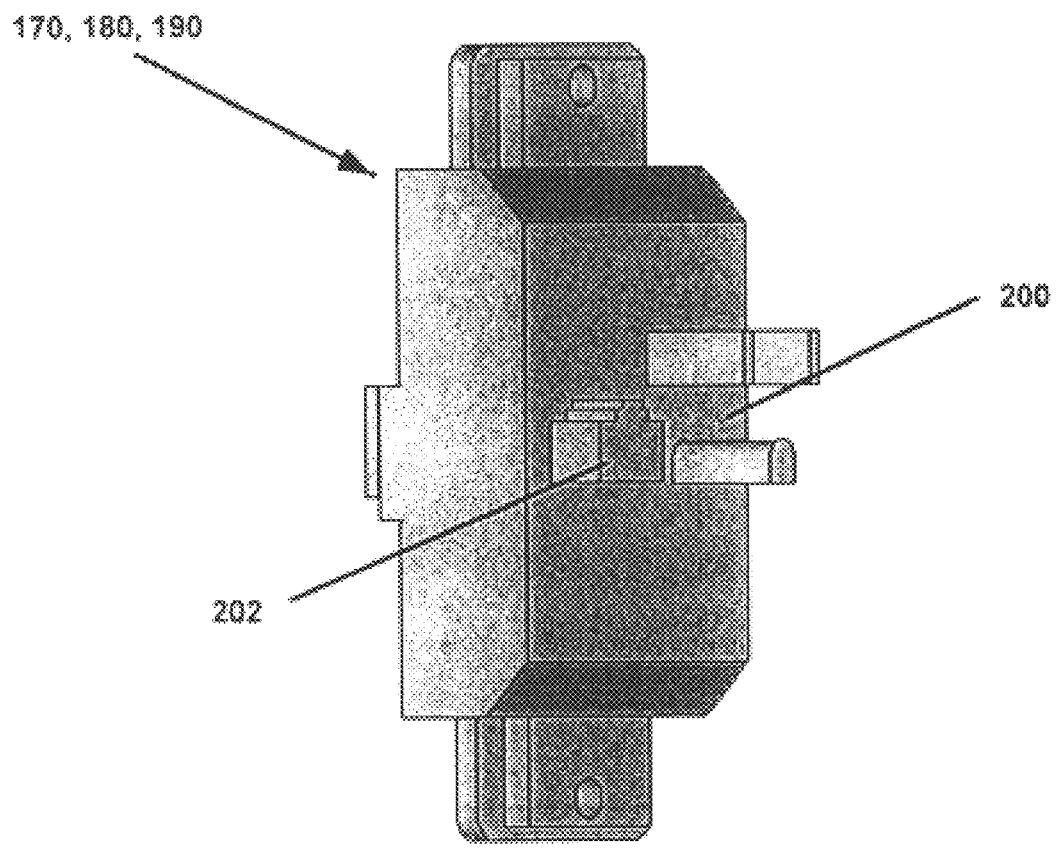
FIG. 15 is a view of the rear portions of the plug and play modules of FIGS. 11, 12 and 13, which are identical to facilitate interchangeability of the modules.

Finally, FIG. 15 provides a rear view of either one of the plug and play switch assembly 170, or the plug and play outlet assembly 180 or the non plug and play adapter assembly 190. All three have identical rear configurations for optimal versatility/changeability. Those skilled in the art will appreciate that male connector prongs 200 extend from rear of the high-voltage side of the plug and play module 170, 180, and 190 while an RJ-style male connector 202 extends from the rear of the low voltage side of the plug and play modules 170, 180 and 190. The respective prongs 200, 202 are adapted for insertion respectively into the three-pronged female connector 128, and the RJ-style connector 130, of the termination block 120.

Although the present invention has been described with reference to above-described embodiments, those skilled in the art will recognize that various modifications and variations can be accomplished without departing from the spirit and scope of the present invention, and that such modifications are clearly contemplated herein. Moreover, no limitation with respect to the specific embodiments disclosed herein is intended nor should any be inferred.

What is claimed is:

1. An electrical system for controlling a remotely located device through an electrical wiring system comprising a plurality of junction boxes electrically wired together, each of the junction boxes comprising a housing, a low voltage connector block attached to the housing, and an electrical receptacle mounted on and electrically connected to the box, wherein the receptacle is electrically connected to the low voltage connector block; and an external low voltage controller is in electrical communication with the receptacle, wherein the external controller is adapted to provide a signal to the receptacle for controlling the remotely located device.

2. The electrical system of claim 1 wherein the signal is a digital signal.

3. The electrical system of claim 1 wherein the signal is an analog signal.

4. A method for controlling a remotely operated device through an electrical wiring system comprising:

providing a first electrical junction box comprising a first control receptacle, providing a second electrical junction box wired together with the first electrical junction box, the second electrical junction box comprising a second control receptacle, placing an external device in electrical communication with the first control receptacle, wherein the external device is adapted to perform a function in response to a signal, placing an external control in electrical communication with the second control receptacle, and causing the external control to emit the signal through the second control receptacle, wherein the signal causes the external device to perform the function in response thereto.

5. The method of claim 4 wherein the signal is a digital signal.

6. The method of claim 4 wherein the signal is an analog signal.

7. A modular receptacle comprising a base unit defined by a housing having high and low voltage portions separated by a barrier; a termination block comprising high and low voltage connections defined by a snap-in module and adapted to engage the base unit, wherein the block is adapted to facilitate termination of high and low voltage connections to respective high and low voltage portions of the base unit; a housing cover adapted to be installed over both the base unit and the engaged termination block, wherein the housing cover comprises an opening adapted for accommodating receipt and passage thereinto of at least a face portion of the termination block.

8. The modular receptacle of claim 7 further comprising a plug and play unit containing smart circuitry, the unit comprising high and low voltage connections for engagement with the respective high and low voltage connections of the termination block.

9. The modular receptacle of claim 8 wherein the plug and play unit comprises an electrical outlet and a low voltage connection socket.

10. The modular receptacle of claim 9 wherein the plug and play unit comprises an electrical toggle switch.

11. The modular receptacle of claim 7 wherein the housing cover comprises an electrical safety barrier to protect against electrical shock.

12. The modular receptacle of claim 7 wherein the termination block comprises a spring latch connection system, whereby the block is retained within the base housing member.

13. The modular receptacle of claim 7 wherein the termination block comprises a plurality of electrical receptacles, and includes a built-in, internal logic system.

14. The electrical system of claim 8, wherein the high voltage connection of the termination block comprises at least one male connector defining a single, medially insulated prong having a first segment that is electrically positive and a second segment that is electrically negative; and wherein the plug and play unit comprises at least one female connector defining a single, medially insulated receptor having a corresponding first segment that is electrically positive and a second segment that is electrically negative;

wherein the prong is removably and matingly engageable with the receptor of the female connector, wherein the corresponding segments engage one another in electrically conductive communication.

15. The electrical system of claim 14, wherein the male and female connectors each comprise three distinct circumferentially disposed segments, each male segment adapted for corresponding engagement with its female counterpart, and wherein the corresponding segments comprise respective positive, neutral, and ground elements.

16. A modular receptacle comprising a base unit defined by a housing having high and low voltage portions separated by a barrier; a termination block comprising high and low voltage connections defined by a snap-in module and adapted to engage the base unit, wherein the block is adapted to facilitate termination of high and low voltage connections to respective high and low voltage portions of the base unit; a housing cover adapted to be installed over both the base unit and the engaged termination block, wherein the housing cover comprises an opening adapted for accommodating receipt and passage thereinto of at least a face portion of the termination block, wherein the receptacle further comprises a plug and play unit containing smart circuitry, the unit comprising high and low voltage connections for engagement with the respective high and low voltage connections of the termination block, and wherein the termination block comprises a connection system formed by tabs, whereby the block is retained within the base housing member.

17. The modular receptacle of claim 16 wherein the plug and play unit comprises an electrical outlet and a low voltage connection socket.

18. The modular receptacle of claim 17 wherein the plug and play unit comprises an electrical toggle switch.

19. The modular receptacle of claim 18 wherein the housing cover comprises an electrical safety barrier to protect against electrical shock.

20. An electrical system for controlling a plurality of remotely located devices through an electrical wiring system comprising a plurality of electrical junction boxes wired together, each of the electrical junction boxes comprising a housing, a low voltage connector block attached to the housing, an electrical receptacle mounted on and electrically connected to the box, each receptacle electrically connected to the low voltage connector block, and an external controller in electrical communication with the receptacle, wherein the external controller is adapted to provide a signal to the receptacle for controlling at least one of the remotely located devices.

21. The electrical system of claim 20 wherein each of a plurality of the electrical receptacles includes a built-in, internal logic system adapted to change the functionality of that receptacle.

22. The electrical system of claim 21 wherein a plurality of electrical junction boxes are wired together in series.

23. The electrical system of claim 22 wherein said connector block further comprises high and low voltage sides, and wherein there is complete independence of operation between said high and low voltage sides of any given receptacle.

24. The electrical system of claim 23 wherein at least one connector block of at least one receptacle comprises only one of either of said high and low voltage sides.

* * * * *